July 12, 1966  J. E. JOHNSON  3,260,063
WARNING SYSTEM FOR TEMPERATURE CONTROLLED CRAFT COMPARTMENT
Filed July 31, 1964
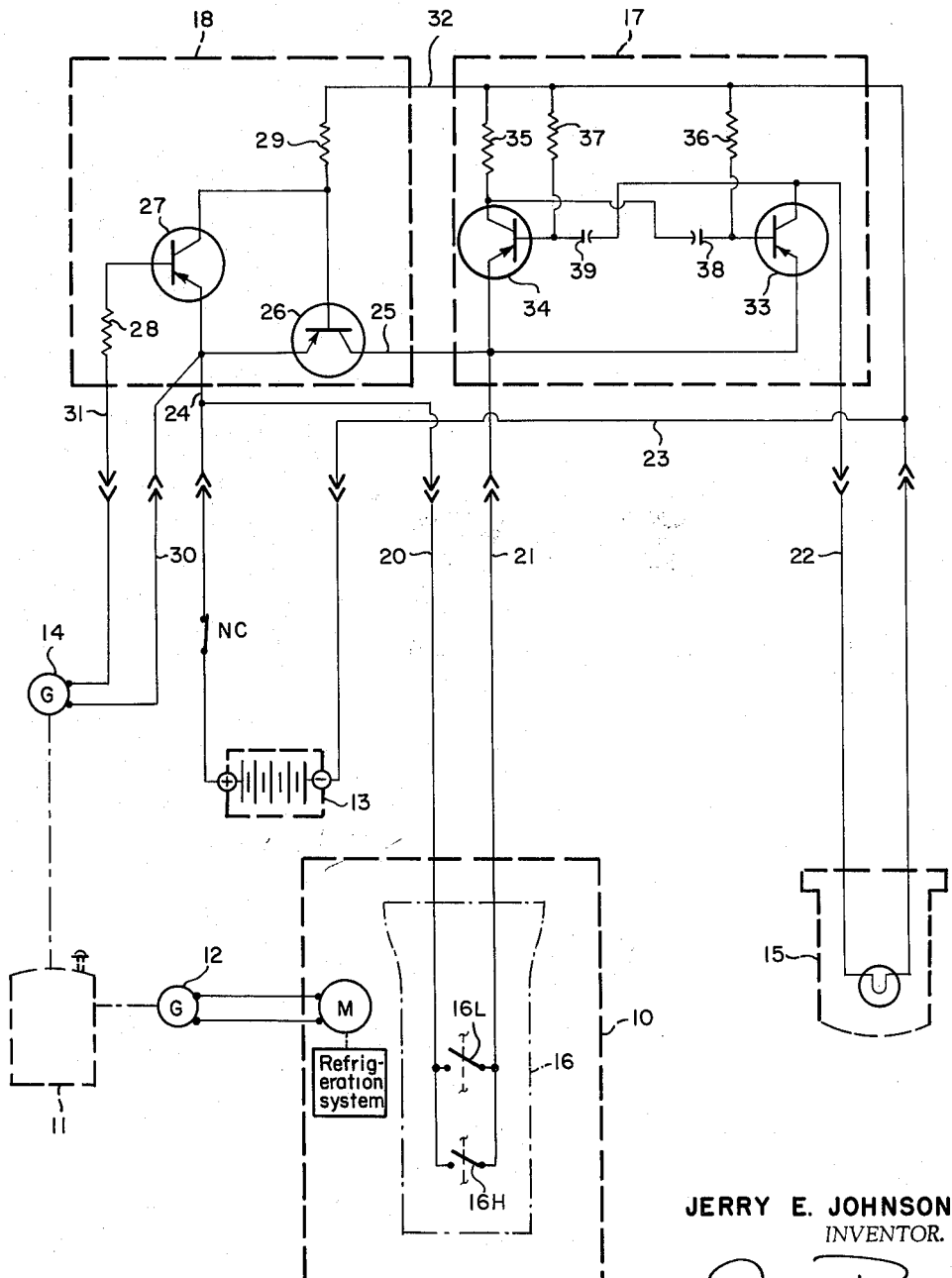
JERRY E. JOHNSON
INVENTOR.
BY *Seed & Berry*
ATTORNEYS

United States Patent Office 3,260,063
Patented July 12, 1966

3,260,063
WARNING SYSTEM FOR TEMPERATURE CONTROLLED CRAFT COMPARTMENT
Jerry E. Johnson, Bellevue, Wash., assignor to Ryan Recording Thermometer Co., Seattle, Wash., a corporation of Delaware
Filed July 31, 1964, Ser. No. 386,668
8 Claims. (Cl. 62—126)

The present invention relates to warning systems for refrigeration systems of the type in which electrical energy for operating the system components is derived from a generator driven by an internal combustion engine located at the refrigeration site.

Such systems are commonly employed in refrigerated railroad cars and refrigerated trucks and truck-trailers. During piggy-back operations, as for example, when railroad cars or truck trailers are being transported by barge, or when trailers are being transported on railroad flat cars, it is particularly difficult to monitor operation of the engine and refrigeration system. In such cases, a man must be periodically put onto the barge or flatcar, and this usually involves delay since forward propulsion must normally be stopped for the check in order to get the man aboard.

Accordingly, the principal object of the present invention is to provide a simple and effective warning system by which failure of the engine or refrigeration system can be detected by an observer located remote from the refrigeration.

Other more particular objects and advantages of the invention will, with the foregoing, appear and be understood from the following description and claims, the invention consisting in the novel construction and in the adaptation and combination of parts hereinafter described and claimed.

In the accompanying drawing, the single figure is a schematic of a warning system embodying the present invention.

Numeral 10 designates a refrigerated compartment having a self-contained refrigeration system (not shown) with its compressor driven by an electric motor deriving its electrical energy from a generator 12 driven by an internal combustion engine 11. A storage battery 13 is present for providing power for the starter of the engine 12 and is kept charged in the conventional manner by operation of a generator 14 or alternator driven by the engine.

The present invention contemplates that the refrigerated compartment and the engine-generator set 11–12 will normally be located on the same craft. For purposes of example, an electric lamp 15 on the craft has been indicated in the drawing as the warning instrumentality to indicate by flashing that there has been a failure or malfunction of the engine 11, or of the refrigeration system for the compartment 10. In the practice of the present invention the battery 13 is preferred as the source of power for operating the warning instrument, but any other convenient reliable source can be used.

Located within the compartment 10 for monitoring its temperature is an adjustable self-contained thermostat 16 having high and low normally-open switches 16H and 16L. These switches are wired in parallel so that when either is closed responsive to a rise or fall in the compartment temperature above or below a preset temperature range, a circuit is completed by leads 20–21 from the battery 13 to a flasher 17, thence to the warning lamp 15 by lead 22, and back to the battery by lead 23.

Also included in the control system is a solid state switch 18 which is wired by leads 24–25 in parallel with the switches of the thermostat 16. These leads 24–25 are interconnected by a PNP transistor 26 having its emitter communicating with lead 24, its collector connected to lead 25, and its base biased from the collector of the second PNP transistor 27 which also has its emitter communicating with battery lead 24. The emitters of transistors 26–27 are also connected via a lead 30 with the output of the battery-charging generator 14, and the base of transistor 27 connects by a lead 31 via a resistor 28 to the other terminal of the generator 14. The switch 18 is completed by a resistor 29 in a lead 32 which connects with lead 23 to the negative terminal of the battery 13.

By this arrangement, whenever the generator 14 is operating, thereby indicating operation of the engine 11, the transistor 27 is conducting via the generator leads 30–31, and this biases the base of the transistor 26 to the same voltage present at its emitter. In this condition the transistor 26 does not conduct, and hence whenever the engine 12 is operating the switch 18 is open.

The flasher 17 may take the form of a solid state multivibrator which for purposes of example has been shown as the collector-coupled type. In this instance the lamp 15 is utilized as a collector load resistor for one of the two PNP transistors 33–34, the corresponding resistor for the other transistor being numbered 35. Numerals 36–37 have in turn been applied to the base resistors of the transistors, and their coupling capacitors are designated 38–39. If the resistance of the resistor 35 is made equal to that of the lamp 15 and if the rest of the corresponding parameters of the multivibrator are made equal to one another, the flashing signal of the lamp will have a symmetrical time division.

In the operation of the present device, if the engine 11 should stop as for lack of fuel or a mechanical failure, the normally open switch unit 18 would close as a consequence of the resulting stoppage of output from the battery charging generator 14. This closure of the switch 18 completes a circuit from the battery 13 to the flasher 17 and lamp 15 via lead 24, transistor 26, and lead 25. The resulting flashing light warns of the engine failure.

If on the other hand, the refrigeration system should fail to hold the temperature of the compartment 10 down to the upper limit of the setting of the thermostat 16, because of difficulties other than engine failure, as for example, failure or malfunction of the generator 14, or of a component or control mechanism of the refrigeration system, a power circuit to the flasher 17 and lamp 15 will be completed from the battery 13 via lead 20, switch 16H and lead 21. Similarly, if the controls of the refrigeration system should fail to hold the compartment temperature above the lower limit of the thermostat setting, the circuit to the flasher and lamp would be completed by the switch 16L.

The warning lamp 15 is so located on the craft containing the refrigerated compartment as to be readily observable from a location remote to the craft. In the case of a barge it will normally be located at the front so as to be readily viewed from aboard the tug. Alternatively, in the case of a refrigerated railroad car, a pair of the warning lamps wired in parallel, may be mounted on the opposite sides of the car so as to be observable from the engine cab or by a stationmaster as the train passes through a station.

When the invention is incorporated in a refrigerated truck trailer the warning lamp may be located such as to be directly behind the rear window of the truck cab to be in full view of the driver. In addition, a second warning lamp or a buzzer may be mounted on the dashboard of the cab and wired in parallel with the lamp on the trailer, the wiring including a jack provided near the trailer hitch for ready disconnect when the trailer is unlatched.

It is thought that the invention will have been clearly understood from the foregoing detailed description.

Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

I claim:

1. In combination, a craft adapted to be towed, a non-propulsion internal combustion engine on said craft, a primary generator driven by said engine, a battery, a generator for charging said battery driven by said engine, a compartment on said craft, a temperature control system for said compartment including an electric motor deriving its electrical energy from said primary generator, thermostat means in said compartment including normally-open high and low temperature switches arranged to respectively close automatically when the temperature in said compartment rises above or lowers beneath a preset temperature range, a normally inactive electrical warning device external of said compartment, a first power circuit for said warning device from said battery and including said switches in parallel with one another whereby said warning device is activated as a consequence of the closing of either of said switches, a second power circuit for said warning device from said battery, and normally-open switch means in said second power circuit operatively associated with said battery charging generator to close whenever the voltage output of the latter ceases, whereby said warning is activated whenever said engine stops or whenever the temperature in said compartment departs from said range.

2. The combination of claim 1 in which said temperature control system comprises a refrigeration system having a compressor driven by said electric motor.

3. The combination of claim 1 in which said warning device comprises an electrical warning lamp and flasher means connected to said power circuits for flashing said lamp responsive to closing of either of said power circuits.

4. The combination of claim 3 in which said flasher means comprises a solid state multivibrator having said warning lamp as a load resistor.

5. The combination of claim 3 in which said flasher means comprises a solid state collector-coupled multivibrator having said warning lamp as a collector load resistor.

6. The combination of claim 5 in which the emitter side of said multivibrator is electrically connected with said first power circuits, and in which said normally-open switch means in said second power circuit comprises first and second PNP transistors having their emitters connected to the outputs of said battery charging generator and said battery, said first transistor having its collector connected to the emitter side of said multivibrator and having its base connected to the collector of said second transistor, and the base of said second transistor being grounded, whereby the base of said first transistor is biased to the same potential as its emitter so that said first transistor does not conduct from said battery to said multivibrator unless said second transistor is not being charged by said battery charging generator as a consequence of stoppage of said engine.

7. The combination of claim 1 in which said normally-open switch means in said second power circuit comprises a first transistor arranged to electrically interconnect said battery with said warning device when said first transistor is not biased, and a second transistor electrically connected to said battery charging generator and said first transistor for biasing the latter when there is output from said battery charging generator so that said first transistor does not conduct from said battery to said warning device unless said second transistor is not being charged by said battery charging generator as a consequence of stoppage of said engine.

8. In combination, an internal combustion engine, a primary generator driven by said engine, a battery, a generator for charging said battery driven by said engine, a compartment, a temperature control system for said compartment including an electric motor deriving its electrical energy from said primary generator, thermostat means in said compartment including normally-open high and low temperature switches arranged to respectively close automatically when the temperature in said compartment rises above or lowers beneath a preset temperature range, a normally inactive electrical warning device external of said compartment, a first power circuit for said warning device from said battery and including said switches in parallel with one another whereby said warning device is activated as a consequence of the closing of either of said switches, a second power circuit for said warning device from said battery, and normally-open switch means in said second power circuit operatively associated with said battery charging generator to close whenever the voltage output of the latter ceases, whereby said warning is activated whenever said engine stops or whenever the temperature in said compartment departs from said range.

References Cited by the Examiner
UNITED STATES PATENTS

| | | | |
|---|---|---|---|
| 2,534,633 | 12/1950 | Smith | 340—249 |
| 2,766,439 | 10/1956 | Palm | 340—222 |
| 2,916,670 | 12/1959 | Pederson. | |
| 3,005,114 | 10/1961 | Martin et al. | |
| 3,022,456 | 2/1962 | Larson et al. | 322—99 X |
| 3,056,065 | 9/1962 | Porterfield. | |
| 3,136,982 | 6/1964 | Sargent | 340—213.1 |
| 3,174,143 | 3/1965 | Akin | 340—213 |

ROBERT A. O'LEARY, *Primary Examiner.*

W. E. WAYNER, *Assistant Examiner.*